(12) United States Patent
Hu et al.

(10) Patent No.: US 12,133,276 B2
(45) Date of Patent: Oct. 29, 2024

(54) LINK FAILURE RECOVERY IN C-DRX MODE

(71) Applicant: HUAWEI TECHNOLOGIES CO., LTD., Guangdong (CN)

(72) Inventors: Wenquan Hu, Kista (SE); Bengt Lindoff, Kista (SE); Rama Kumar Mopidevi, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 772 days.

(21) Appl. No.: 17/158,793

(22) Filed: Jan. 26, 2021

(65) Prior Publication Data
US 2021/0160947 A1 May 27, 2021

Related U.S. Application Data

(63) Continuation of application No. PCT/EP2019/059498, filed on Apr. 12, 2019.

(30) Foreign Application Priority Data

Jul. 27, 2018 (WO) ................. PCT/EP2018/070477

(51) Int. Cl.
*H04W 76/19* (2018.01)
*H04L 1/1812* (2023.01)
(Continued)

(52) U.S. Cl.
CPC .......... *H04W 76/19* (2018.02); *H04L 1/1812* (2013.01); *H04W 24/08* (2013.01);
(Continued)

(58) Field of Classification Search
None
See application file for complete search history.

(56) References Cited

U.S. PATENT DOCUMENTS

10,893,571 B2 * 1/2021 Sadiq .................... H04W 76/28
11,425,774 B2 * 8/2022 Zhou .................... H04B 17/103
(Continued)

FOREIGN PATENT DOCUMENTS

| CN | 101132207 A | 2/2008 |
|----|-------------|--------|
| CN | 101772048 A | 7/2010 |

(Continued)

OTHER PUBLICATIONS

3GPP TS 38.133 V15.2.0 (Jun. 2018), "3rd Generation Partnership Project;Technical Specification Group Radio Access Network;NR-;Requirements for support of radio resource management(Release 15)," Jun. 2018, 79 pages.

(Continued)

*Primary Examiner* — Faiyazkhan Ghafoerkhan
(74) *Attorney, Agent, or Firm* — Fish & Richardson P.C.

(57) ABSTRACT

The present disclosure relates to client devices and methods for link failure recovery in discontinuous reception (DRX) in connected mode (C-DRX). One example client device is configured to perform beam/link monitoring according to a link recovery procedure if the client device is in a C-DRX mode operation with a network access node, where a configured beam failure detection (BFD) timer of the link recovery procedure is a function of a periodicity of beam failure indications.

18 Claims, 4 Drawing Sheets

(51) Int. Cl.
  *H04W 24/08*  (2009.01)
  *H04W 52/02*  (2009.01)
  *H04W 76/18*  (2018.01)
  *H04W 76/27*  (2018.01)
  *H04W 76/28*  (2018.01)
  *H04W 80/02*  (2009.01)
  *H04W 84/12*  (2009.01)

(52) U.S. Cl.
  CPC ....... *H04W 52/0216* (2013.01); *H04W 76/18* (2018.02); *H04W 76/27* (2018.02); *H04W 76/28* (2018.02); *H04W 80/02* (2013.01); *H04W 84/12* (2013.01)

(56) References Cited

U.S. PATENT DOCUMENTS

| | | | | |
|---|---|---|---|---|
| 11,490,442 | B2* | 11/2022 | Cirik | H04W 72/0446 |
| 11,611,468 | B2* | 3/2023 | Zhou | H04L 5/00 |
| 11,616,684 | B2* | 3/2023 | Da Silva | H04B 7/0619 |
| | | | | 370/216 |
| 2011/0217973 | A1 | 9/2011 | Gfors et al. | |
| 2013/0315122 | A1* | 11/2013 | Sirotkin | H04L 67/148 |
| | | | | 370/311 |
| 2014/0098657 | A1* | 4/2014 | Kubota | H04W 12/033 |
| | | | | 370/216 |
| 2015/0098380 | A1* | 4/2015 | Tseng | H04W 72/541 |
| | | | | 370/336 |
| 2015/0126206 | A1* | 5/2015 | Krishnamurthy | H04W 56/001 |
| | | | | 455/452.1 |
| 2016/0227602 | A1 | 8/2016 | Yi et al. | |
| 2017/0223562 | A1* | 8/2017 | Jeong | H04W 24/04 |
| 2018/0279168 | A1* | 9/2018 | Jheng | H04L 5/001 |
| 2019/0089579 | A1* | 3/2019 | Sang | H04W 56/0035 |
| 2019/0141552 | A1* | 5/2019 | Chen | H04B 7/0617 |
| 2019/0159279 | A1* | 5/2019 | Sadiq | B29B 13/022 |
| 2019/0215896 | A1* | 7/2019 | Zhou | H04B 7/0456 |
| 2019/0222290 | A1* | 7/2019 | Ly | H04L 5/0094 |
| 2019/0387470 | A1 | 12/2019 | Nam et al. | |
| 2019/0394082 | A1* | 12/2019 | Cirik | H04W 76/28 |
| 2020/0036430 | A1 | 1/2020 | Kim et al. | |
| 2020/0351126 | A1* | 11/2020 | Siomina | H04W 76/25 |
| 2020/0359246 | A1 | 11/2020 | Zhang et al. | |
| 2021/0051755 | A1* | 2/2021 | Bao | H04W 24/10 |
| 2021/0105171 | A1* | 4/2021 | Chen | H04B 7/0695 |
| 2021/0135926 | A1 | 5/2021 | Siomina et al. | |
| 2021/0160947 | A1* | 5/2021 | Hu | H04W 76/19 |
| 2021/0328857 | A1* | 10/2021 | Da Silva | H04L 43/16 |
| 2023/0106975 | A1* | 4/2023 | Siomina | H04L 25/0224 |
| | | | | 370/252 |
| 2023/0275801 | A1* | 8/2023 | Da Silva | H04B 7/0619 |
| | | | | 370/216 |
| 2024/0040482 | A1 | 2/2024 | Dinan | |

FOREIGN PATENT DOCUMENTS

| | | |
|---|---|---|
| CN | 102172067 A | 8/2011 |
| CN | 102457409 A | 5/2012 |
| CN | 102845122 A | 12/2012 |
| CN | 107079459 A | 8/2017 |
| CN | 107210826 A | 9/2017 |

OTHER PUBLICATIONS

3GPP TS 38.213 V15.2.0 (Jun. 2018), "3rd Generation Partnership Project;Technical Specification Group Radio Access Network;NR;Physical layer procedures for control(Release 15)," Jun. 2018, 99 pages.
3GPP TS 38.214 V15.2.0 (Jun. 2018), "3rd Generation Partnership Project;Technical Specification Group Radio Access Network;NR;Physical layer procedures for data (Release 15)," Jun. 2018, 95 pages.
3GPP TS 38.321 V15.2.0 (Jun. 2018), "3rd Generation Partnership Project;Technical Specification Group Radio Access Network;NR;Medium Access Control (MAC) protocol specification(Release 15)," Jun. 2018, 73 pages.
CATT, "Beam Failure Detection," 3GPP TSG-RAN WG2#101, R2-1802142, Athens, Greece, Feb. 26-Mar. 2, 2018, 4 pages.
PCT International Search Report and Written Opinion issued in International Application No. PCT/EP2019/059499 on Jul. 12, 2019, 13 pages.
Qualcomm Inc, "BFD procedure in DRX mode," 3GPP TSG-RAN WG2 Meeting #AH NR 1802, R2-1810424, Montreal, Canada, Jul. 2-6, 2018, 2 pages.
Office Action issued in Chinese Application No. 201980050033.8 on Aug. 3, 2022, 36 pages (with English translation).
Office Action issued in Chinese Application No. 201980050061.X on Aug. 8, 2022, 14 pages (with English translation).
Qualcomm, "Correction to BFD Procedure in DRX Mode," 3GPP TSG-RAN WG2 #AH NR 1802, R2-1810425, Montreal, Canada, Jul. 2-6, 2018, 3 pages.
Ericsson, "Network-based CRS interference mitigation for legacy UE in RRC_Connected," 3GPP TSG RAN WG4 Meeting #84bis, R4-1711302, Dubrovnik, Croatia, Oct. 9-13, 2017, 3 pages.
Ericsson, "On warm-up and cool-down periods in network-based CRS interference mitigation," 3GPP TSG RAN WG4 Meeting #86bis, R4-1804699, Melbourne, Australia, Apr. 16-20, 2018, 5 pages.
Partial Supplementary European Search Report in European Appln No. 23155983.2, dated Nov. 6, 2023, 15 pages.

* cited by examiner

LINK FAILURE RECOVERY IN C-DRX MODE

CROSS-REFERENCE TO RELATED APPLICATIONS

This application is a continuation of International Application No. PCT/EP2019/059498, filed on Apr. 12, 2019, which claims priority to International Application No. PCT/EP2018/070477, filed on Jul. 27, 2018. The disclosures of the aforementioned applications are hereby incorporated by reference in their entireties.

TECHNICAL FIELD

The invention relates to a client device for link failure recovery in C-DRX mode. Furthermore, the invention also relates to corresponding methods and a computer program.

BACKGROUND

Discontinuous reception (DRX) in connected mode (C-DRX) is a key feature to reduce user equipment (UE) power consumption in 3GPP new radio (NR). A UE does not need to continuously monitor the physical downlink control channel (PDCCH) in C-DRX mode. A DRX cycle consists of active time and sleep time, corresponding to the active state and sleep state, respectively. The active time includes the time during drx-onDurationTimer or drx-InactivityTimer or drx-RetransmissionTimerDL or drx-RetransmissionTimerUL or ra-ContentionResolutionTimer is running; or a Scheduling Request is sent on physical uplink control channel (PUCCH) and is pending; or a PDCCH indicating a new transmission addressed to the C-RNTI of the medium access control (MAC) entity has not been received after successful reception of a Random Access Response for the Random Access Preamble not selected by the MAC entity among the contention-based Random Access Preamble. In active time, the UE turns on its receiver, monitors the PDCCH, and receives downlink (DL) data and control signaling. While in sleep time, the UE can turn off a significant part of its hardware, especially its RF circuits. In non-DRX mode, the UE always turns on its receiver and stays in the active state. A UE activity during a DRX cycle is illustrated in FIG. 4. In DRX the time is divided into long DRX cycles ("Long_DRX_cycle") in which on-duration timers ("On_Duration_Timer") identify the time when the UE needs to monitor the PDCCH. Once data is received, the UE activate an inactivity timer and once expired the UE goes back to sleep state until next on duration period.

It is to be noted that beam failure recovery, link failure recovery and link recovery mean the same thing in the present disclosure. These terms are therefore mutually exchangeable.

In the beam failure recovery procedure, a UE is configured with a set of CSI-RS and/or SS/PBCH block by the higher layer parameter failureDetectionResources explicitly or without the higher layer parameter failureDetectionResources implicitly for radio link monitoring. The UE monitors the radio link quality of the reference signals in the Candidate-Beam-RS-List. The physical layer in the UE provides an indication to higher layers when the radio link quality for all corresponding resource configurations in the set $\bar{q}_0$ that the UE uses to assess the radio link quality is worse than the threshold value $Q_{out,LR}$. The physical layer informs the higher layers when the radio link quality is worse than the threshold value $Q_{out,LR}$ with a periodicity determined by the maximum between the shortest periodicity of periodic CSI-RS configurations or SS/PBCH blocks in the set $\bar{q}_0$ that the UE uses to assess the radio link quality and 2 msec.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a client device for a wireless communication system, the client device being configured to perform beam/link monitoring according to a link recovery procedure if the client device is in C-DRX mode operation with a network access node, wherein a configured beam failure detection, BFD, timer of the link recovery procedure is a function of a periodicity of beam failure indications.

A client device in this disclosure can e.g. be a 3GPP UE.

To perform beam monitoring or link monitoring is herein considered equivalent procedures. These terms are therefore mutually exchangeable.

That the client device is in non-DRX mode operation can be understood to mean that the client device needs to continuously monitor a control channel, such as a physical control channel.

That the client device is in C-DRX mode operation can be understood to mean that the client device only needs to monitor a control channel under time periods defined by a DRX configuration received from the network, e.g. from a network access node.

An advantage of the client device according to the first aspect is that link recovery procedure can be configured differently for non-DRX operation and C-DRX mode operation and by that optimized beam monitoring can be achieved for both non-DRX operation and C-DRX mode operation. Further, maintaining the link availability in C-DRX mode operation is possible with a client device according to the first aspect. Reduced client device power consumption is yet another advantage with a client device according to the first aspect since reduced active time is possible.

In an implementation form of a client device according to the first aspect, the function is based on a periodicity for radio link monitoring resources across DRX cycles and the DRX period.

An advantage with this implementation form is that the link recovery procedure can be adapted to either DRX period or radio link monitoring resources across DRX cycles, based on configured scenarios, and by that optimized power saving in the client device can be achieved.

In an implementation form of a client device according to the first aspect, the function is the maximum of the shortest periodicity for radio link monitoring resources across DRX cycles and the DRX period.

An advantage with this implementation form is that the link recovery procedure can be adapted to different DRX periods and by that optimized power saying in the client device can be achieved.

In an implementation form of a client device according to the first aspect, the function is a first function if the DRX period is less than or equal to a threshold value, and the function is a second function if the DRX period is greater than the threshold value.

An advantage with this implementation form is that the link recovery procedure can be adapted to different DRX periods and by that optimized power saving in the client device can be achieved.

In an implementation form of a client device according to the first aspect, the threshold value is 320 ms.

An advantage with this implementation form is that the link recovery procedure can be adapted for longer DRX periods and by that optimized power saving in the client device can be achieved.

In an implementation form of a client device according to the first aspect, the client device being configured to
start the BFD timer upon a beam failure instance indication.

An advantage with this implementation form is that the client device starts the BFD timer at a well-defined time instant, meaning the network access node knows that it is conform usage of the BFD timer over all client devices in a cell, thereby improving system capacity.

In an implementation form of a client device according to the first aspect, the client device being configured to
set a beam failure instance, BFI, counter to zero when the BFD timer expires.

An advantage with this implementation form is that the client device knows when the radio link has been restored, since no more indications has been received from lower layers, and by that there is no need for starting the beam recovery procedure. This minimizes the random access signaling in the system.

In an implementation form of a client device according to the first aspect, the client device being configured to
transmit a beam recovery request upon a number of beam failure instances in the C-DRX mode operation is reached by the BFI counter in the MAC layer.

An advantage with this implementation form is that the client device knows that the radio link is currently broken and by that random access procedure is started only when necessary.

In an implementation form of a client device according to the first aspect, the client device being configured to manipulate the BFD timer according to at least one of
a. If the BFD timer expires and if the MAC entity is not in active time, restart the BFD timer, and do not reset the BFI counter,
b. Suspend the BFD timer when the MAC entity leaves active time, and resume the BFD timer when MAC entity enters active time again, and
c. Prolong the BFD timer corresponding to the DRX period plus possible offset once inactivity timer or on duration timer or HARQ retransmission timer expires.

An advantage with this implementation form is that a simple way to cope with C-DRX is implemented and by that optimized tradeoff between system performance and client device power consumption is achieved.

In an implementation form of a client device according to the first aspect, the client device being configured to
manipulate the BFD timer when the client device is in C-DRX mode operation.

An advantage with this implementation form is that the BFD timer behavior is adapted to C-DRX mode operation and hence consistent beam link monitoring is achieved also in the C-DRX mode.

In an implementation form of a client device according to the first aspect, the link recovery procedure comprises a set of MAC/RRC parameters.

An advantage with this implementation form is that the different link recovery procedures are easily determined by the client device.

In an implementation form of a client device according to the first aspect, the set of MAC/RRC parameters is at least one of
beamFailureInstanceMaxCount;
beamFailureDetectionTimer;
beamFailureCandidateBeamThreshold;
preamblePowerRampingStep;
preambleReceivedTargetPower;
preambleTxMax; and
ra-ResponseWindow.

An advantage with this implementation form is that the network access node has possibility to do a flexible link recovery procedure configuration for optimized system capacity.

According to a second aspect of the invention, the above mentioned and other objectives are achieved with a method for a client device, the method comprises
performing beam/link monitoring according to a link recovery procedure if the client device is in C-DRX mode operation with a network access node, wherein a configured beam failure detection, BFD, timer of the link recover procedure is a function of a periodicity of beam failure indications.

The method according to the second aspect can be extended into implementation forms corresponding to the implementation forms of the client device according to the first aspect. Hence, an implementation form of the method comprises the feature(s) of the corresponding implementation form of the client device.

The advantages of the methods according to the second aspect are the same as those for the corresponding implementation forms of the client device according to the first aspect.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION

According to the current specification, for instance in NR Release 15, a beam recovery request can be transmitted if the number of consecutive detected beam failure instance exceeds a configured maximum number. In the MAC layer, the following UE variables are used for the beam failure detection procedure: BFI_COUNTER: counter for beam failure instance indication which is initially set to 0. The MAC entity shall:

1> if beam failure instance indication has been received from lower layers:
  2> start or restart the beamFailureDetectionTimer;
  2> increment BFI_COUNTER by 1;
  2> if BFI_COUNTER=beamFailureInstanceMaxCount+1:
    3> initiate a Random Access procedure on the SpCell by applying the parameters configured in BeamFailureRecoveryConfig.
1> if the beamFailureDetectionTimer expires:
  2> set BFI_COUNTER to 0.
1> if the Random Access procedure is successfully completed
  2> consider the Beam Failure Recovery procedure successfully completed.

For a typical case in non-DRX mode, a UE can be or is configured with the CSI-RS periodicity 320 slots and SCS is 120 KHz. The beamFailureDetectionTimer is set as pbfd1 and a beamFailureInstanceMaxCount is set to 10. These parameters can work well.

Setting beamFailureDetectionTimer as pbfd1 may mean, for instance that the timer is equal to one beam failure detection RS period.

Figure 5:
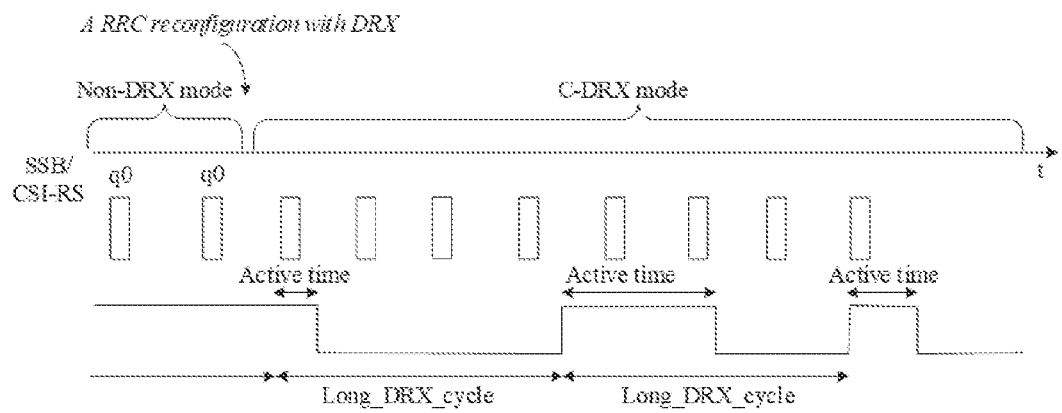
FIG. 5 shows beam monitoring according to conventional solution.

However, in C-DRX mode, following the current specification, which does not specify specific behavior for C-DRX, the UE may need to perform beam monitoring during its sleep time, i.e. in non-active time periods, ruin the power saving feature of DRX as illustrated in FIG. 5. As shown in FIG. 5 the UE, according to the current specification need to monitor the SSB/CSI_RS q0 also during sleep time (i.e. the non-Active time).

One way to overcome the problems in the current specification is to carefully choose the beam monitoring parameters for fitting the beam monitoring to the DRX. One example is to set beamFailureInstanceMaxCount parameter to 1, however, then there will be significant risk for false BFR triggering. Another solution is to set DRX period to a very small number, e.g. 10 ms, then the NW node (gNB) might tweak the parameters to fit the DRX structure, however 10 ms DRX period with, say 5 ms on-time, is basically no DRX gain at all. Hence, the current link recovery procedure that is defined for the 3GPP NR Rel-15 specification is not sufficient for link maintenance in C-DRX and improved link recovery procedure in C-DRX is needed.

The inventors have realized that the current adopted specification for link recovery as previously described is only suitable when a UE is in non-DRX connected mode which is not suitable for UE power consumption in C-DRX mode. Embodiments of the invention therefore among other things solve the problem of specifying the link recovery procedure in C-DRX mode operation. An objective is to maintain the power saving benefit of C-DRX and also the link availability when beam failure occurs in C-DRX mode operation.

Embodiments of the invention disclose link (failure) recovery procedures for a UE in C-DRX mode. Embodiments of the invention disclose a method and apparatus for a client device (in a non-limiting example corresponding to a User Equipment, UE) for beam monitoring in C-DRX mode operation through being configured with specific beam failure detection reference signals q0_drx during on-durations by the network that is different from the periodic beam failure detection reference signals used in non-DRX mode.

In the C-DRX mode operation the client device may use a beam failure detection (BFD) timer which is a function of a periodicity of beam failure indications.

The client device only monitors the specific beam failure detection reference signals during active time in C-DRX mode. Furthermore, the specific beam failure detection reference signals may be aperiodic.

Figure 1:
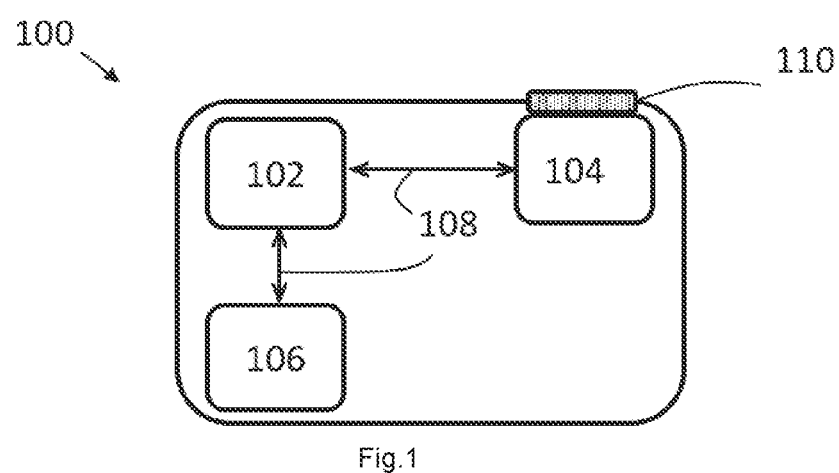
FIG. 1 shows a client device according to an embodiment of the invention.

FIG. 1 shows a client device 100 according to an embodiment of the invention. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which means that the client device 100 is configured for wireless communications in a wireless communication system. That the client device 100 is configured to perform certain actions can in this disclosure be understood to mean that the client device 100 comprises suitable means, such as e.g. the processor 102 and the transceiver 104, configured to perform said actions.

According to embodiments of the invention the client device 100 is configured to perform beam/link monitoring according to a link recovery procedure if the client device 100 is in C-DRX mode operation with a network access node 300, wherein a configured beam failure detection, BFD, timer of the link recovery procedure is a function of a periodicity of beam failure indications.

Figure 2:
FIG. 2 shows a method for a client device according to an embodiment of the invention.

FIG. 2 shows a flow chart of a corresponding method 200 which may be executed in a client device 100, such as the one shown in FIG. 1. The method 200 comprises performing 202 beam/link monitoring according to a link recovery procedure if the client device 100 is in C-DRX mode operation with a network access node 300, wherein a configured beam failure detection, BFD, timer of the link recovery procedure is a function of a periodicity of beam failure indications.

The function is in embodiments based on a periodicity for radio link monitoring resources across DRX cycles and the DRX period. The function can be the maximum of the shortest periodicity for radio link monitoring resources across DRX cycles and the DRX period.

In further embodiments the client device 100 performs beam/link monitoring according to a first link recovery procedure if the client device 100 is in non-DRX mode operation and performs beam/link monitoring according to another second link recovery procedure if the client device 100 is in C-DRX mode operation. According to embodiments of the invention, to perform beam/link monitoring according to the first link recover procedure comprises provide indications to a higher layer when the radio link quality is worse than a threshold value with a first periodicity; and to perform beam/link monitoring according to the second link recovery procedure comprises provide indications to the higher layer when the radio link quality is worse than a threshold value with a second periodicity.

This can also imply that different sets of MAC/RRC parameters are used when the first link recovery procedure is employed compared to when the second link recovery procedure is employed by the client device 100. Embodiments of the invention hence discloses a method and apparatus for a client device for beam failure recovery in C-DRX mode operation through being configured a different set of parameters for beam failure recovery and following a different link recovery procedure compared with that in non-DRX mode. The different set of parameters for beam failure recovery includes at least one of the following MAC/RRC parameters:

beamFailureInstanceMaxCount;
beamFailureDetectionTimer;
beamFailureCandidateBeamThreshold;
preamblePowerRampingStep;
preambleReceivedTargetPower;
preambleTxMax;
ra-ResponseWindow.

In embodiments the beam monitoring periodicity, in the second link recovery procedure, is a function of the DRX period and the beam failure monitoring reference signal set q0 periodicity (CSI-RS, SSB) for the C-DRX mode operation.

For link recovery in C-DRX mode, the client device 100 shall or can, in slots where the radio link quality according to the set of reference signals q0_drx is assessed, provide an indication to higher layers when the radio link quality for all corresponding resource configurations in the set q0_drx that the client device 100 uses to assess the radio link quality is worse than the threshold Qout,LR. The physical layer of the client device 100 informs the higher layers of the client device 100 when the radio link quality is worse than the threshold Qout,LR with a periodicity determined by the maximum between the shortest periodicity of periodic CSI-RS configurations or SS/PBCH blocks in the set q0_drx and 2 ms and the DRX period according to an embodiment of the invention.

In embodiments, for link recovery in C-DRX mode, the physical layer informs the higher layers when the radio link quality is worse than the threshold Qout,LR with a periodicity determined by the maximum between the shortest periodicity of periodic CSI-RS configurations or SS/PBCH blocks in the set q0_drx and 2 ms; and the beamFailureDetectionTimer may be handled in a different way for C-DRX mode compared to non-DRX mode.

In other words, the beam monitoring periodicity, in the second link recovery procedure, during active times of the C-DRX period is a maximum of the shortest periodicity for the C-DRX mode operation and 2 ms.

Figure 3:
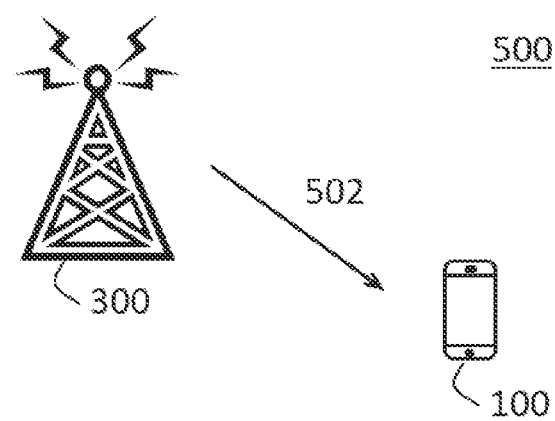
FIG. 3 shows a wireless communication system according to an embodiment of the invention.
Figure 4:
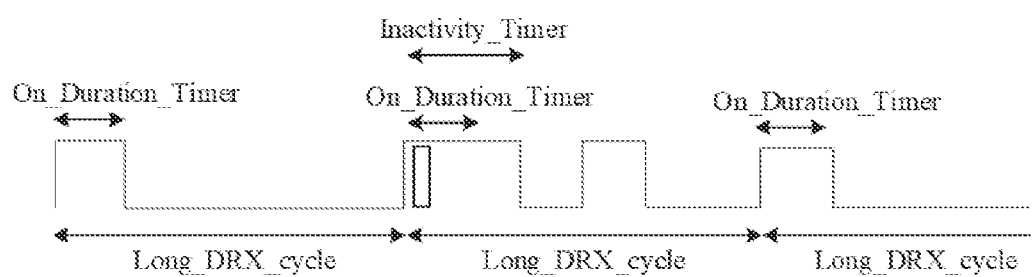
FIG. 4 shows a UE operating in C-DRX mode.

FIG. 3 shows a wireless communication system 500 according to an embodiment of the invention. The wireless communication system 500 comprises a client device 100 and a network access node 300 configured to operate in the wireless communication system 500. For simplicity, the wireless communication system 500 shown in FIG. 3 only comprises one client device 100 and one network access node 300. However, the wireless communication system 500 may comprise any number of client devices 100 and any number of network access nodes 300 without deviating from the scope of the invention.

In the wireless communication system 500, the network access node 300 determines a RRC connected mode for a client device 100 and transmits control signaling 502 to the client device 100 configure the client device 100 with a link recovery procedure depending on the determined RRC connected mode. In embodiments of the invention, if the client device 100 is determined to be in RRC connected non-DRX mode operation the network access node 300 transmits a first signal/signaling to configure the client device with a first link recovery procedure; and if the client device 100 is determined to be in RRC connected C-DRX mode operation, the network access node 300 transmits a second signal/signaling to configure the client device 100 with another, i.e. a second link recovery procedure, which is different to the first link recovery procedure. Upon reception of the control signaling from the network access node 300 the client device 100 performs beam/link monitoring according to a link recovery procedure if the client device 100 is in C-DRX mode operation with a network access node 300, wherein a configured BFD timer of the link recovery procedure is a function of a periodicity of beam failure indications.

In the following description of further embodiments of the invention, the wireless communication system 500 is set in a 3GPP NR context. This means that a client device 100 corresponds to a UE and a network access node 300 to a gNB, etc. Other terms and expressions from NR are hence also used for completeness of description.

A general principle in this disclosure is that different link recovery procedures are employed for non-DRX mode and C-DRX mode, respectively. A detailed illustration of the beam failure recovery procedure in C-DRX mode operation is described in this section. In non-DRX mode, a UE is configured with specific beam failure reference signals q0 and performs beam monitoring according to prior art principles.

Beam Failure Recovery Procedure in C-DRX Mode Operation

When a UE is in C-DRX mode operation, beam/link monitoring can be performed according to a second link recovery procedure.

The UE can receive DRX configuration in either RRC Connection Setup or RRC Connection Reconfiguration to enter C-DRX mode.

In particular, the UE can receive DRX configuration in RRC Connection Reconfiguration signaling from a gNB to enter into C-DRX mode.

In the case of RRC reconfiguration message, the set of reference signals q0 to monitor can be updated to a DRX set, i.e. q0-drx. The UE starts to assess the radio link quality according to the set q0-drx of resource configurations against out-of-sync threshold configured by the network.

The physical layer in the UE provides an indication to higher layers when the radio link quality for all corresponding resource configurations in the set $\bar{q}_0$-drx that the UE uses to assess the radio link quality is worse than the threshold $Q_{out,LR}$ with an indication period as the maximum between the shortest periodicity for radio link monitoring resources and 2 ms.

In a further implementation, the indication period may be the maximum between the DRX period and the shortest periodicity for radio link monitoring resources and 2 ms as previously described.

In embodiments the indications to higher layers is sent as a function of DRX period and the beam failure monitoring reference signals (RS) q0 (CSI-RS, SSB) (i.e. radio link monitoring resources) for C-DRX mode. In embodiments, the function may be x*DRX period wherein x may be larger than 1, e.g. 1.2, or 1.5 for instance. In other embodiments the function may be maximum of x*DRX period and y*radio link monitoring resources, where x and y may be larger than or equal to 1, and may in embodiments be the same value, i.e. x=y, and in other embodiments be different values. The function may in turn be a function of the DRX period as well, i.e. for DRX period<threshold value a first function is used, and for DRX period>threshold value a second function is used. In other words, the function is a first function if the DRX period is less than or equal to a threshold value, and the function is a second function if the DRX period is greater than the threshold value. In embodiments the threshold value is 320 ms.

A beamFailureDetectionTimer value in C-DRX mode is configured which is expressed in a number (e.g. 1-10) of indication periodicities, which equals to the maximum between the shortest periodicity for radio link monitoring resources across DRX cycles and the DRX period.

In an embodiment, the timer is set to 1 such indication period. The beamFailureDetectionTimer starts upon a beam failure instance indication.

In another embodiment, the beamFailureDetectionTimer in C-DRX mode may be expressed in beam failure indication or beam failure reporting periodicities wherein the beam failure indication or beam failure reporting period is a function of the DRX period. In embodiments, the function may be x*DRX period wherein x may be larger than 1, e.g. 1.2, or 1.5 for instance. In other embodiments the function may be maximum of x*DRX period and y*radio link monitoring resources, where x and y may be larger than or equal to 1, and may in embodiments be the same value, i.e. x=y, and in other embodiments be different values. The function may in turn be a function of the DRX period as well, i.e. for DRX<=threshold a first function is used, and for DRX>threshold a second function is used. The beamFailureDetectionTimer may be a MAC parameter. Also, in this case the threshold value can be 320 ms.

In embodiments, the BFD timer is set to 1 such indication period. The client device 100 is configured to start the BFD timer (beamFailureDetectionTimer) upon a beam failure instance indication.

The BFI_COUNTER is initially set to 0 and increased by 1 when a beam failure instance indication has been received from lower layers. When the beamFailureDetectionTimer expires, the BFI_COUNTER is set to 0 according to embodiments of the invention. In embodiments, upon a contiguous number of beam failure instances in C-DRX mode is reached by the BFI-COUNTER in MAC layer, a beam recovery request can be transmitted.

In embodiments the UE is configured with a first link recovery procedure for non-DRX and a second link recovery procedure for C-DRX, wherein the first and second link recovery procedures can differ in the set of reference signals to monitor, i.e. reference signal sets q0 vs q0_drx, or in beam failure parameters, such as beam failure indication (BFI) period, or beam failure detection parameters, such as beamFailureDetectionTimer or BFI_counter parameters according to the DRX configurations or a combination thereof.

In other words, the first link recovery procedure includes a first reference signal set q0 to perform beam/link monitoring in the non-DRX mode operation, and the second link recovery procedure includes a second reference signal set q0_drx to perform beam/link monitoring in the C-DRX mode operation.

However, the main difference between the two link recovery procedures is that in the second link recovery procedure, beam failure detection only happens during active times of the C-DRX cycle. Reference signals transmitted by the gNB outside the active times of the C-DRX cycle which therefore cannot be received by the UE don't play any role for the link recovery procedure for C-DRX.

For other beam failure recovery parameters, such as:
beamFailureCandidateBeamThreshold, preamblePowerRampingStep, preambleReceivedTargetPower, preambleTxMax, ra-ResponseWindow; in order to reduce the latency of the beam recovery compared with in non-DRX mode, the network would probably set a smaller value for beamFailureCandidateBeamThreshold preambleTxMax and ra-ResponseWindow, and a higher value for preamblePowerRampingStep and preambleReceivedTargetPower. In this way, UE's active time can be shortened and the UE power consumption can be reduced.

Hence, the UE in connected mode, determines/obtains the connection state, non-DRX or C-DRX (typically in the MAC layer, based on received configuration) and based on the connection state applies the corresponding link recovery procedure, as described above.

In an example, the UE in connected mode determines/obtains the connection state, non-DRX or C-DRX, based on received configuration and based on the connection state applies the corresponding link recovery procedure according to received communications, as described above.

The non-DRX link recovery procedure follows current procedures as described in the 3GPP NR specification.

Below are details of two different C-DRX beam monitoring behavior for beam failure recovery (BFR) covered by the invention. Both embodiments described below can be understood to be possible implementations of the general embodiments described above.

Exemplary Embodiment 1

In this embodiment, when the UE is in C-DRX, the UE performs beam monitoring according to the max(DRX periodicity, and the shortest BFD RS periodicity), i.e. as the maximum of DRX periodicity and the shortest BFD RS periodicity, as defined by the second link recovery procedure mentioned above.

Figure 6:
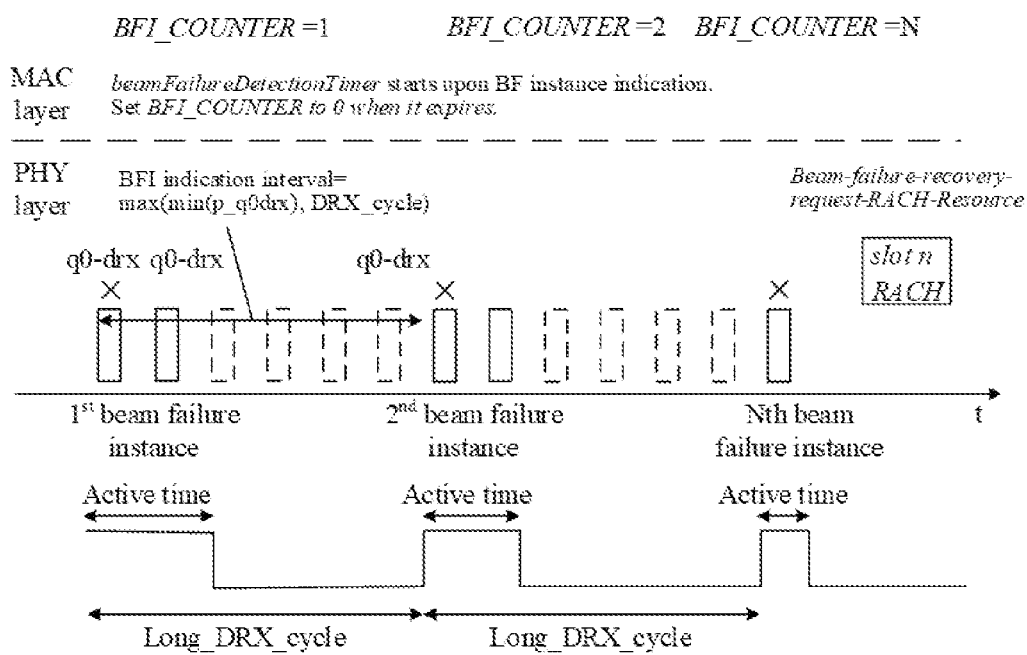
FIG. 6 illustrates beam failure recovery procedure in C-DRX mode operation according to an embodiment of the invention.

From FIG. 6 it can be seen that the UE only performs link/beam monitoring during active times of the UE.

In the MAC layer a beamFailureDetectionTimer is started upon beam failure (BF) instance indication. Also, in the MAC layer the BFI_COUNTER is set to 0 when the timer expires.

In FIG. 6 the rectangular blocks in the physical (PHY) layer show the set of reference signals q0-drx for the C-DRX mode of the UE. Blocks with solid lines are the ones which are received by the UE during active times. Only these are of relevance for the determination of a beam failure during C-DRX mode operation. Blocks with dashed lines are not received by the UE in its active time and do not play a role, for instance they are not used for beam failure detection purposes. In the example shown in FIG. 6 the example DRX period is larger than the minimum RS period (between two of the q0-drx blocks). Hence, although during active time the UE might receive two or more reference signal transmission only one per DRX period is relevant for the beam/link monitoring. Therefore, a beam monitoring (beam failure indication, BFI) is fed to MAC layer once per DRX period, regardless of active time length of the C-DRX period. Accordingly, the BFI reset timer in the MAC layer is arranged for the C-DRX mode. Although in this example a specific set of reference signals q0-drx is specified in further embodiments the UE may monitor the same set of reference signals q0 for both C-DRX and non-DRX mode (i.e. normal mode).

Exemplary Embodiment 2

In this embodiment, when in C-DRX mode, the UE performs beam monitoring according to max(shortest RS periodicity, and 2 ms), i.e. as the maximum of shortest RS periodicity and 2 ms, only in active time as defined by the second link recovery procedure. This means that beam monitoring is performed more times during time periods with data reception and transmission where active time in a cycle is longer than that in other cycles. In other words, in this embodiment during active times of a DRX period the UE may follow the beam monitoring principles in non-DRX as for example specified by above mentioned first link recover procedure.

Figure 7:
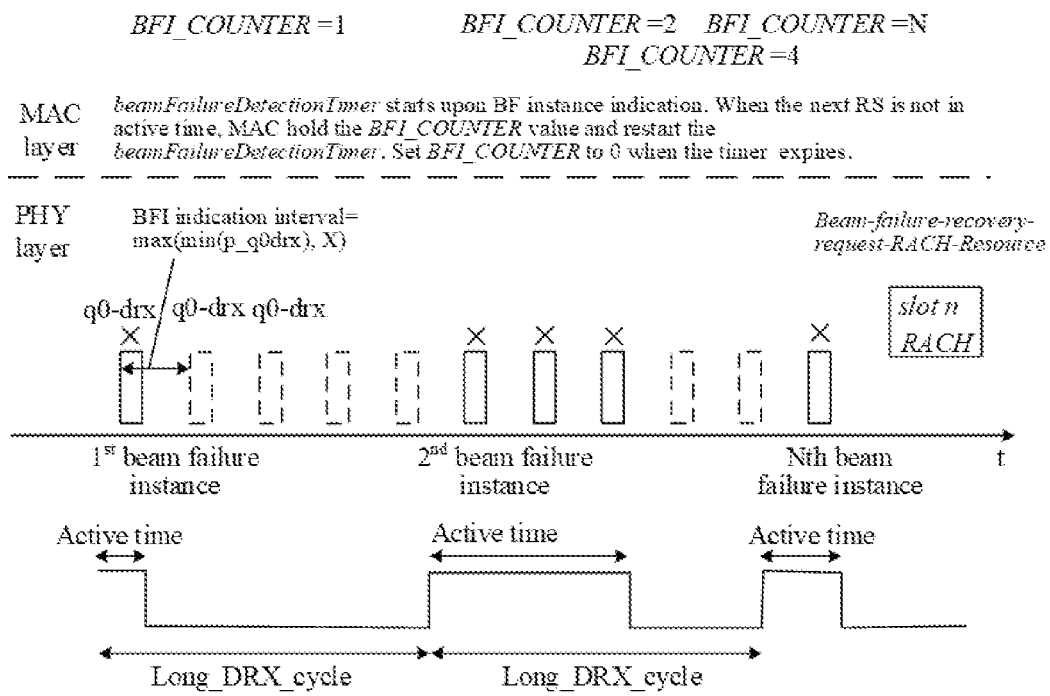
FIG. 7 illustrates beam failure recovery procedure in C-DRX mode operation according to an embodiment of the invention in which during active time a regular beam monitoring is performed.

FIG. 7 shows an example of beam failure recovery procedure in C-DRX mode operation in which during the active time a regular beam monitoring is performed. As can be seen from FIG. 7, the UE performs beam monitoring (and send BFI to higher layer) with periodicity corresponding to the shortest CSI-RS periodicity (or smallest value of, say 2 ms).

In the MAC layer a beamFailureDetectionTimer is started upon beam failure (BF) instance indication. When the next beam failure detection reference signals are not in active time the MAC layer holds the BFI_COUNTER value and restarts the beamFailureDetectionTimer. Further, in the MAC layer the BFI_COUNTER is set to 0 when the timer expires.

In this embodiment of the invention the BFD timer, i.e. beamFailureDetectionTimer, behavior has to be manipulated in C-DRX mode (e.g. when the client device 100 is in C-DRX mode) compared to the behavior in prior art. In the example above:
  The BFD timer (beamFailureDetectionTimer) is restarted, and BFI counter (BFI_COUNTER) is NOT reset if the BFI timer expires when the MAC entity is not in active time. In other words, If the BFD timer expires and if the MAC entity is not in active time, restart the BFD timer, and do not reset the BFI counter,
  Other BFD timer manipulations may also be applicable, for instance:
  Suspend the BFD timer when MAC entity leaves active time, and resume BFD timer when MAC entity enters active time again.
  Prolong BFD timer corresponding to the DRX period plus possible offset once inactivity timer or on-duration timer or HARQ retransmission timer expires and hence non-active time starts. The possible offset may be chosen such that it will adapt to the exact on-duration time position for the specific UE (i.e. which SFN to monitor).
  More specifically, when prolonging or manipulating the BFD timer, valid to all above embodiments for C-DRX link recovery procedures. The values is extended to cover, not only BFD RS periodicity, but also be configured in terms of DRX periods, e.g., but not limited to 1, 2, 3, 4, . . . , n DRX periods. Also, it is possible to configure non-integer timer, i.e. 1.5, 2.5 DRX periods etc. This may furthermore be DRX period dependent. Hence, in this embodiment the gNB can configure the UE with a BFD timer expressed in DRX periods in C-DRX case, while can configure the UE in BFD RS periods in non-DRX mode. Hence, the BFD timer is configured according to different functions depending on of the client device 100 is in non-DRX mode or C-DRX mode. Hence, in embodiments, the function is a first function if the DRX period is less than or equal to a threshold value, and the function is a second function if the DRX period is greater than the threshold value. The threshold value may be 320 ms. The configuration may be RRC configuration, but in other examples dynamic switch between BFD RS and DRX periodicity using e.g. MAC CE may also be possible.

In embodiments to manipulate or prolong the BFD timer, the BFD timer configuration may be performed in terms of beam failure indication periods wherein the beam failure indication periods are expressed based on BFD RS periods if the UE is configured for non-DRX and based on DRX periods if the UE is configured for C-DRX.

In further embodiments, the UE can be configured with specific BFD timer for DRX, i.e. a beamFailureDetection-TimerDRX to be used in C-DRX, expressed in DRX cycles (as described above) and beamFailureDetectionTimer to be used in non-DRX, expressed in BFD RS periods as in the current specification. Using the above last two embodiments, there is no need to monitor the active/non-active time in the MAC layer for the BFD timer, as in some of the other embodiments, described above.

In the following disclosure possible specification changes for NR is proposed and discussed. Both Layer 1 and Layer 2 specification impact is proposed and discussed.

Layer 1 Specification Impact

Below it is described how the embodiments of the invention can be implemented as text additions in the specification, 3GPP TS38.213, 15.2.0 section 6 Link recovery procedure.

6 Link recovery procedure: A UE can be provided, for a serving cell, with a set $\bar{q}_0$ of periodic CSI-RS resource configuration indexes by higher layer parameter failureDetectionResources and with a set $\bar{q}_1$ of periodic CSI-RS resource configuration indexes and/or SS/PBCH block indexes by higher layer parameter candidateBeamRSList for radio link quality measurements on the serving cell. If the UE is not provided with higher layer parameter failureDetectionResources, the UE determines the set $\bar{q}_0$ to include SS/PBCH block indexes and periodic CSI-RS resource configuration indexes with same values as the RS indexes in the RS sets indicated by the TCI states for respective control resource sets that the UE uses for monitoring PDCCH. The UE expects the set $\bar{q}_0$ to include up to two RS indexes and, if there are two RS indexes, the set $\bar{q}_0$ includes only RS indexes with QCL-TypeD configuration for the corresponding TCI states. The UE expects single port RS in the set $\bar{q}_0$.

The threshold $Q_{out,LR}$ corresponds to the default value of higher layer parameter rlmInSyncOutOfSyncThreshold and to the value provided by higher layer parameter rsrp-ThresholdSSB, respectively.

The physical layer in the UE assesses the radio link quality according to the set $\bar{q}_0$ of resource configurations against the threshold $Q_{out,LR}$ as described in section 10, TS 38.133. For the set $\bar{q}_0$, the UE assesses the radio link quality only according to periodic CSI-RS resource configurations or SS/PBCH blocks that are quasi co-located, as described in section 6, TS 38.214, with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by higher layer parameter powerControlOffsetSS.

In non-DRX mode, the physical layer in the UE provides an indication to higher layers when the radio link quality for all corresponding resource configurations in the set $\bar{q}_0$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity of periodic CSI-RS configurations or SS/PBCH blocks in the set $\bar{q}_0$ that the UE uses to assess the radio link quality and 2 msec.

Corresponding to exemplary embodiment 2: In DRX mode, the physical layer in the UE, when MAC entity is in active time, provides an indication to higher layers when the radio link quality for all corresponding resource configurations in the set $\bar{q}_0$ that the UE uses to assess the radio link quality is worse than the threshold $Q_{out,LR}$. The physical layer informs the higher layers, when the radio link quality is worse than the threshold $Q_{out,LR}$ with a periodicity determined by the maximum between the shortest periodicity of periodic CSI-RS configurations or SS/PBCH blocks in the set $\bar{q}_0$ that the UE uses to assess the radio link quality and 2 msec.

Corresponding to exemplary embodiment 1: In DRX mode, the physical layer in the UE, provides an indication to higher layers when the radio link quality for all corresponding resource configurations in the set that the UE uses to assess the radio link quality is worse than the threshold Qout,LR. The physical layer informs the higher layers, when the radio link quality is worse than the threshold Qout,LR with a periodicity determined by the maximum between:
  Y times the shortest periodicity of periodic CSI-RS configurations or SS/PBCH blocks in the set that the UE uses to assess the radio link quality and 2 ms, and
  X times the DRX period,
where X and Y have the value 1.5 when DRX period is less than or equal to 320 ms and X and Y have the value 1 when DRX period is larger than 320 ms.

Upon request from higher layers, the UE provides to higher layers the periodic CSI-RS configuration indexes and/or SS/PBCH block indexes from the set $\bar{q}_1$ and the corresponding L1-RSRP measurements that are larger than or equal to the corresponding thresholds.

A UE may be provided with a control resource set through a link to a search space set provided by higher layer parameter recoverySearchSpaceId, as described in Subclause 10.1, for monitoring PDCCH in the control resource set. If the UE is provided higher layer parameter recoverySearchSpaceId, the UE does not expect to be provided another search space set for monitoring PDCCH in the control resource set associated with the search space set provided by recoverySearchSpaceId.

The UE may receive by higher layer parameter PRACH-ResourceDedicatedBFR, a configuration for PRACH transmission as described in Subclause 8.1. For PRACH transmission in slot n and according to antenna port quasi co-location parameters associated with periodic CSI-RS configuration or SS/PBCH block with index $q_{new}$ provided by higher layers as in section 11, TS 38.321, the UE monitors PDCCH in a search space provided by higher layer parameter recoverySearchSpaceId for detection of a DCI format with CRC scrambled by C-RNTI starting from slot n+4 within a window configured by higher layer parameter BeamFailureRecoveryConfig. For the PDCCH monitoring and for the corresponding PDSCH reception, the UE assumes the same antenna port quasi-collocation parameters with index $q_{new}$ until the UE receives by higher layers an activation for a TCI state or any of the parameters TCI-StatesPDCCH-ToAddlist and/or TCI-StatesPDCCH-ToReleaseList. After the UE detects a DCI format with CRC scrambled by C-RNTI in the search space provided by recoverySearchSpaceId, the UE monitors PDCCH candidates in the search space provided by recoverySearchSpaceId until the UE receives a MAC CE activation command for a TCI state or higher layer parameters TCI-StatesPDCCH-ToAddlist and/or TCI-StatesPDCCH-ToReleaseList.

If the UE is not provided a control resource set for a search space set provided recoverySearchSpaceId or if the UE is not provided recoverySearchSpaceId, the UE does not expect to receive a PDCCH order triggering a PRACH transmission.

Layer 2 Specification Impact

Below it is shown the BFD timer manipulation "restart BFD timer if timer expires during non-Active time" in C-DRX, impact on the TS38.321, 15.2.0 specification.

5.17 Beam Failure Detection and Recovery procedure:
The MAC entity may be configured by RRC with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity.

RRC configures the following parameters in the BeamFailureRecoveryConfig for the Beam Failure Detection and Recovery procedure:
  beamFailureInstanceMaxCount for the beam failure detection;
  beamFailureDetectionTimer for the beam failure detection;
  beamFailureRecoveryTimer for the beam failure recovery procedure;
  rsrp-ThresholdSSB: an RSRP threshold for the beam failure recovery;
  powerRampingStep: powerRampingStep for the beam failure recovery;
  preambleReceivedTargetPower: preambleReceivedTargetPower for the beam failure recovery;
  preambleTransMax: preambleTransMax for the beam failure recovery;
  ra-ResponseWindow: the time window to monitor response(s) for the beam failure recovery using contention-free Random Access Preamble;
  prach-ConfigIndex: prach-ConfigIndex for the beam failure recovery;
  ra-ssb-OccasionMaskIndex: ra-ssb-OccasionMaskIndex for the beam failure recovery;
  ra-OccasionList: ra-OccasionList for the beam failure recovery.

The following UE variables are used for the beam failure detection procedure:
  BFI_COUNTER: counter for beam failure instance indication which is initially set to 0.

The MAC entity shall:
1> if beam failure instance indication has been received from lower layers:
  2> start or restart the beamFailureDetectionTimer;
  2> increment BFI_COUNTER by 1;
  2> if BFI_COUNTER>=beamFailureInstanceMaxCount:
    3> if beamFailureRecoveryConfig is configured:
      4> start the beamFailureRecoveryTimer, if configured;
      4> initiate a Random Access procedure (see subclause 5.1) on the SpCell by applying the parameters powerRampingStep, preambleReceivedTargetPower, and preambleTransMax configured in beamFailureRecoveryConfig.
3> else:
4> initiate a Random Access procedure (see subclause 5.1) on the SpCell.
1> if the beamFailureDetectionTimer expires and MAC entity is in Active Time:
2> set BFI_COUNTER to 0.
Else
2> restart beamFailureDetectionTimer and hold BFI_counter value
1> if the Random Access procedure is successfully completed (see subclause 5.1):
2> stop the beamFailureRecoveryTimer, if configured;
2> consider the Beam Failure Recovery procedure successfully completed.

Below it is shown the BFD timer manipulation "suspend/resume BFD timer" in C-DRX non-active time, impact on the TS38.321, 15.2.0 specification.

5.7 Discontinuous Reception (DRX): The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other subclauses of this specification. When in RRC_CONNECTED, if DRX is configured, the MAC entity may monitor the PDCCH discontinuously using the DRX operation specified in this subclause; otherwise the MAC entity shall monitor the PDCCH continuously.

When a DRX cycle is configured, the Active Time includes the time while:
drx-onDurationTimer or drx-InactivityTimer or drx-RetransmissionTimerDL or drx-RetransmissionTimerUL or ra-ContentionResolutionTimer (as described in subclause 5.1.5) is running; or
a Scheduling Request is sent on PUCCH and is pending (as described in subclause 5.4.4); or
a PDCCH indicating a new transmission addressed to the C-RNTI of the MAC entity has not been received after successful reception of a Random Access Response for the Random Access Preamble not selected by the MAC entity among the contention-based Random Access Preamble (as described in subclause 5.1.4).
If MAC entity leaves active time
Suspend beamFailureDetectionTimer
If MAC entity enters active time
Resume beam failureDetectionTimer
If MAC entity leaves active time
Prolong beamFailureDetectionTimer corresponding to the DRX period (plus possible offset)

References have been made to 3GPP specifications TS 38.213 and TS 38.321 in the present disclosure. Further, the following definitions of acronyms and glossaries have been used:
NR New Radio
eNB E-UTRAN NodeB
gNode B next generation Node B
TRP Transmission point
UE User equipment
BWP Bandwidth Part
MBB Mobile Broad Band
PDCCH Physical Downlink Control Channel
PDSCH Physical Downlink Shared Channel
PRB Physical Resource Block
CORESET Control Resource Set
SCS Sub-Carrier-Spacing
DCI Downlink Control Information
RACH Random Access Channel
CA Carrier Aggregation
QCL Quasi Co-Located Embodiments of the invention further also relates to the following embodiments and aspects:

A1. A UE configured to
a. If the UE is in non-DRX connection mode with a network access node, perform beam/link monitoring according to a first link recovery procedure,
b. If the UE is in C-DRX mode connection mode with the network access node, perform beam/link monitoring according to a second link recovery procedure.

A2. The UE according to A1, wherein in the second link recovery procedure, the beam monitoring periodicity is a function of DRX and the beam failure monitoring RS q0 (CSI-RS, SSB) for C-DRX mode.

A3. The UE according to A2, wherein the function is the maximum of shortest q0 periodicity for C-DRX mode and the DRX period.

A4. The UE according to A1, wherein in the second link recovery procedure the beam monitoring periodicity during active times of the C-DRX period is maximum of the shortest q0 periodicity for C-DRX mode and 2 ms.

A5. The UE according to any of A1-A4, wherein the second link recovery procedure limits the beam/link monitoring and therefore the sending of BFI indication only down to active times of the C-DRX period and preferably when MAC entity is in active time.

A6. The UE according to A4 or A5, configured to manipulate the beamFailureDetectionTimer according to at least one of
c. If BFD timer expires and if MAC entity is not in active time, restart the BFD timer, and do not reset the BFI counter,
d. Suspend the BFD timer when MAC entity leave active time, and resume BFD timer when MAC entity enters active time again,
e. Prolong BFD timer corresponding to the DRX period (plus possible offset) once inactivity timer or on duration timer (or HARQ retransmission timer) expires.

A7. The UE according to any of A1-A6, wherein first link recovery procedure includes a first set q0 of RS to perform Beam monitoring on in non-DRX connection mode and second link recovery procedure includes a second set q0_drx of RS to perform Beam monitoring on in C-DRX connection mode.

A8. The UE according to any of A1-A7, wherein the first link recovery procedure comprises a first set of (MAC/RRC) parameters and second link recovery procedure comprises a second set of (MAC/RRC) parameters.

A9. The UE according to A8, wherein the first set of (MAC/RRC) parameters is at least one of
beamFailureInstanceMaxCount;
beamFailureDetectionTimer;
beamFailureCandidateBeamThreshold;
preamblePowerRampingStep;
preambleReceivedTargetPower;
preambleTxMax;
ra-ResponseWindow.

B1. A network access node configured to
a. determine a RRC connection mode with UE; and
b. transmit a signaling to configure a link recovery procedure depending on the determined RRC connection mode.

B2. The network access node according to B1, wherein if in RRC connection non-DRX mode the network access node transmits a first signaling to configure a link recovery procedure and if in RRC connection DRX mode, transmit a second signaling to configure another link recovery procedure.

The client device 100 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network access node 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the network access node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A client device for a wireless communication system, the client device configured to:
perform beam/link monitoring according to a link recovery procedure if the client device is in discontinuous reception (DRX) in connected mode (C-DRX) mode operation with a network access node, wherein a configured beam failure detection (BFD) timer of the link recovery procedure is a function of a periodicity of beam failure indications, and wherein the function is based on a periodicity for radio link monitoring resources across DRX cycles and a DRX period.

2. The client device according to claim 1, wherein the function is a maximum of a shortest periodicity for radio link monitoring resources across DRX cycles and the DRX period.

3. The client device according to claim 1, wherein the function is a first function if a DRX period is less than or equal to a threshold value, and wherein the function is a second function if the DRX period is greater than the threshold value.

4. The client device according to claim 2, wherein the threshold value is 320 millisecond (ms).

5. The client device according to claim 1, the client device configured to start the BFD timer upon a beam failure instance indication.

6. The client device according to claim 1, the client device configured to set a beam failure instance (BFI) counter to zero when the BFD timer expires.

7. The client device according to claim 6, the client device configured to transmit a beam recovery request upon a number of beam failure instances in the C-DRX mode operation is reached by the BFI counter in a medium access control (MAC) layer.

8. The client device according to claim 6, the client device configured to manipulate the BFD timer according to at least one of:
   a. If the BFD timer expires and if a medium access control (MAC) entity is not in active time, restart the BFD timer, and do not reset the BFI counter,
   b. Suspend the BFD timer when the MAC entity leaves active time, and resume the BFD timer when MAC entity enters active time again, and
   c. Prolong the BFD timer corresponding to a DRX period plus an offset once an inactivity timer or an on duration timer or a hybrid automatic repeat request (HARQ) retransmission timer expires.

9. The client device according to claim 8, the client device configured to manipulate the BFD timer when the client device is in the C-DRX mode operation.

10. A method for a client device, the method comprising:
performing beam/link monitoring according to a link recovery procedure in response to the client device is in discontinuous reception (DRX) in connected mode (C-DRX) mode operation with a network access node, wherein a configured beam failure detection (BFD) timer of the link recovery procedure is a function of a periodicity of beam failure indications, and wherein the function is based on a periodicity for radio link monitoring resources across DRX cycles and a DRX period.

11. The method according to claim 10, wherein the function is a maximum of a shortest periodicity for radio link monitoring resources across DRX cycles and the DRX period.

12. The method according to claim 10, wherein the function is a first function in response to a DRX period being less than or equal to a threshold value, and wherein the function is a second function in response to the DRX period being greater than the threshold value.

13. The method according to claim 12, wherein the threshold value is 320 millisecond (ms).

14. The method according to claim 10, further comprising starting the BFD timer upon a beam failure instance indication.

15. The method according to claim 10, further comprising setting a beam failure instance (BFI) counter to zero when the BFD timer expires.

16. The method according to claim 15, further comprising transmitting a beam recovery request upon a number of beam failure instances in the C-DRX mode operation is reached by the BFI counter in a medium access control (MAC) layer.

17. The method according to claim 15, further comprising manipulating the BFD timer according to at least one of:
 a. If the BFD timer expires and if a medium access control (MAC) entity is not in active time, restart the BFD timer, and do not reset the BFI counter,
 b. Suspend the BFD timer when the MAC entity leaves active time, and resume the BFD timer when MAC entity enters active time again, and
 c. Prolong the BFD timer corresponding to a DRX period plus an offset once an inactivity timer or an on duration timer or a hybrid automatic repeat request (HARQ) retransmission timer expires.

18. The method according to claim 17, further comprising manipulating the BFD timer when the client device is in the C-DRX mode operation.

* * * * *

UNITED STATES PATENT AND TRADEMARK OFFICE
CERTIFICATE OF CORRECTION

| | | |
|---|---|---|
| PATENT NO. | : 12,133,276 B2 | Page 1 of 1 |
| APPLICATION NO. | : 17/158793 | |
| DATED | : October 29, 2024 | |
| INVENTOR(S) | : Wenquan Hu, Bengt Lindoff and Rama Kumar Mopidevi | |

It is certified that error appears in the above-identified patent and that said Letters Patent is hereby corrected as shown below:

On the Title Page

In Column 1 (item (30) Foreign Application Priority Data), In Line 1, Delete "(WO)" and insert -- (EP) --.

In the Claims

In Column 18, In Line 44, In Claim 4, delete "claim 2," and insert -- claim 3, --.

Signed and Sealed this
Fourth Day of February, 2025

Coke Morgan Stewart
*Acting Director of the United States Patent and Trademark Office*